United States Patent [19]

Schaefer

[11] 4,376,593
[45] Mar. 15, 1983

[54] BODY ASSEMBLY

[76] Inventor: Rudolf Schaefer, Brauerstrasse 35, D-4100 Duisburg 1, Fed. Rep. of Germany

[21] Appl. No.: 166,561

[22] Filed: Jul. 7, 1980

[30] Foreign Application Priority Data

Jul. 4, 1979 [DE] Fed. Rep. of Germany ....... 2926976

[51] Int. Cl.³ ............................................... B25G 3/00
[52] U.S. Cl. .................................... 403/231; 403/334; 52/595
[58] Field of Search ............... 403/381, 331, 375, 364, 403/334, 231; 52/595, 593, 594, 403

[56] References Cited

U.S. PATENT DOCUMENTS

| 911,217 | 2/1909 | Doty | 52/248 |
| 1,903,881 | 4/1933 | Sander et al. | 52/264 X |
| 1,928,547 | 9/1933 | Strong | 52/593 X |
| 2,717,093 | 9/1955 | Mautner | 52/584 X |
| 2,794,293 | 6/1957 | Milrod et al. | 46/26 |
| 3,608,258 | 9/1971 | Spratt | 52/594 X |
| 3,720,027 | 3/1973 | Christensen | 52/593 X |
| 4,109,430 | 8/1978 | Fuller | 52/593 X |
| 4,270,324 | 6/1981 | Schaefer | 52/595 X |
| 4,299,070 | 11/1981 | Oltmanns | 52/594 X |

FOREIGN PATENT DOCUMENTS 880571 6/1953 Fed. Rep. of Germany .......... 46/25

Primary Examiner—Andrew V. Kundrat
Attorney, Agent, or Firm—Spencer & Kaye

[57] ABSTRACT

A body formed of a plurality of individual elements is connected together via tongue and groove connections. The tongues have flanks which are inclined with respect to the base of the tongue and converge with increasing distance from the base, while the associated grooves have a corresponding shape. The flank or flanks of the tongue is provided with projections or recesses which engage recesses or projections respectively on the abutting flanks of the associated grooves.

23 Claims, 11 Drawing Figures

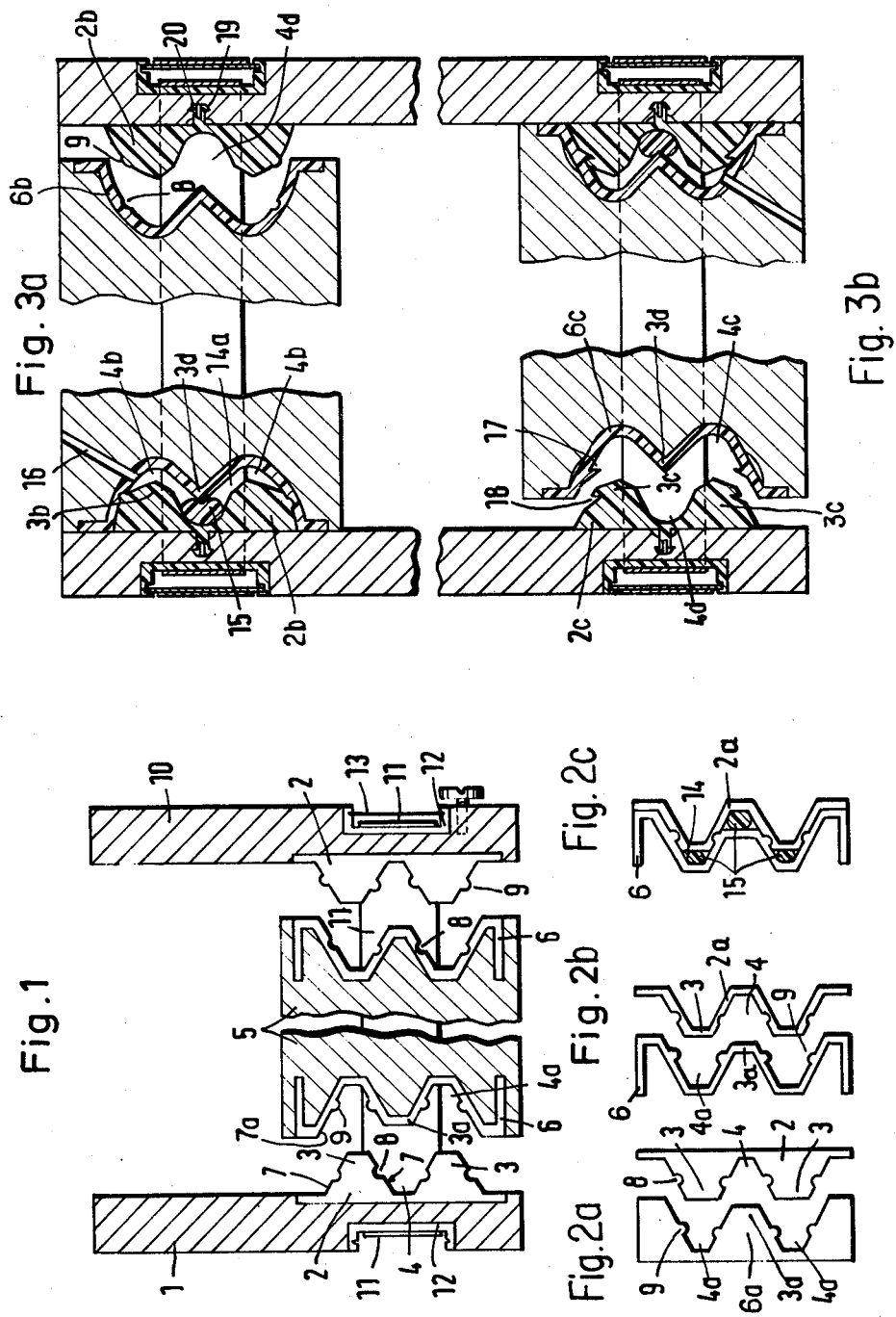

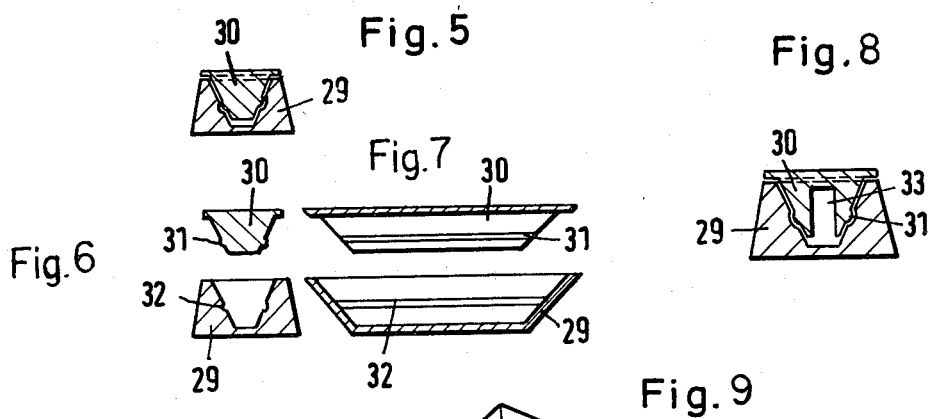

BODY ASSEMBLY

BACKGROUND OF THE INVENTION

The invention relates to a body, in particular a hollow body, which is constructed from individual elements having groove and tongue connections formed in the area of the connecting surfaces with each of the tongues having flanks which get closer together, i.e., converge, at increasing distance from the base of the tongue, and with the grooves being constructed in a manner corresponding to that of the tongues.

A body as described above is known from European Offenlegungsschrift 1 836. This known body is constructed from elements which are held together by means of clamping bands which abut the body from the outside. These clamping bands are unattractive to look at and therefore must often be concealed under covering strips. This is not only expensive but is frequently impracticable such as in the case of furniture making.

SUMMARY OF THE INVENTION

The object of the invention is to provide an improved body of the above described type which can be made up from individual elements in such a way that the elements hold together without any additional holding or accessory means outside the connecting points.

Basically this object is achieved according to the present invention in that the flanks of the tongues or the grooves have recesses into which projections on the flanks of the grooves or tongues respectively lock.

With such a construction the tongues are held in the grooves without any additional means outside the connecting points. The elements are thus securely held to one another without adhesive, clamping bands or any other holding means, and the body consequently does not display any unevenness or unattractive points on the outside or on the inside. The elements can be secured to one another quickly and simply with low constructive effort and inexpensive production and therefore assembly can be also carried out by the unskilled. Moreover, it is impossible to assemble the body incorrectly.

In many cases, such as, for example, furniture making, it is frequently desirable that the body can be taken apart after assembly. Therefore, according to one embodiment of the invention, the projection is positioned releasably in the recess to form a snappng mechanism. This guarantees that the body is particularly easy to take apart. However, it is required in many cases that the elements are placed fixedly one next to the other, particularly where later release is not absolutely necessary. Consequently, according to another embodiment of the invention the projection is positioned fixedly in the recess in order to form a locking mechanism. This connection is particularly firm and can only be released when the groove and tongue are shifted parallel to one another.

Transferability of great forces and secure adhesion are guaranteed when the projection and recess correspond to one another in shape. This is also achieved and/or improved when the tongue and the associated groove each have one projection or one recess on both of their flanks or side surfaces respectively. Preferably, the projections and recesses extend over the entire length of the tongues and grooves.

A detachable connection of simple construction is provided when the projections and recesses have a cross-section in the form of a segment of a circle. An undetachable connection is conversely provided by projections and recesses having a tooth-shaped cross-section. According to the invention, the saw tooth-shaped cross-sections are arranged so that the steeper flank faces the base of the groove.

According to a further feature of the invention, a high degree of movability of the elements relative to one another but with a sufficient amount of tightness is achieved in that when the elements are in the assembled state at least one hollow area is formed between the associated groove and tongue and either this hollow area is filled with a mass of a substance which hardens and/or is permanently elastic or it has at least one elastic band inserted therein. The elastic band is positioned in the base of each groove so that the back of the tongue comes into abutment with the band.

According to still a further feature of the invention, the grooves and/or tongues are formed by profiled members which can be inserted into or attached to the elements. By this feature, a high degree of accuracy in the production of the connecting points as well as a simplification in the construction of the elements is achieved in that the profiled members do not themselves need to have exactly formed grooves or tongues which are matched to the corresponding groove or tongue of the other element.

The profiled members can be fixed particularly easily in the side surfaces or front sides of the elements by means of a groove and tongue arrangement and can be composed of elastic material, in particular, a suitable plastic. Thus the profiled members are easy to manufacture and can achieve a high degree of tightness.

According to another feature of the invention, continuous groove and tongue connections are also achieved in the corner areas of a body formed by the connection of a plurality of elements in that, in the area of the corners of the elements, there is a transition of the tongue of one side surface into a groove of a narrow side or front surface and a transition of a groove of one side surface into a tongue of a narrow side or front surface. This favourably influences production costs and improves the tightness and stability of the connection. After the elements have been assembled together, the grooves and tongues extend in a continuous manner on several abutting front sides without change. In order to simplify construction and make assembly easier the transition surfaces preferably extend at an angle of 45° to the tongues and grooves.

For the particularly reliable transfer of force and a high degree of tightness it is proposed that the grooves and tongues are dimensioned such that the force exerted by a clamping member is substantially transferred between the flanks of the grooves and tongues.

Finally, according to a further embodiment of the invention, an easy to manage and self-centering fastening arrangement, which is also particularly simple in construction and is particularly suited for use with windows and doors, is achieved in that troughlike indentations which are trapezoidal in cross-section are provided at the points of connection and correspondingly shaped inserts are inserted into the troughs. The side surfaces of one of these trapezoidal members, i.e., the trough and the insert, are provided with toroidal elevations or projections in the longitudinal direction of its trapezoidal profile, and these projections lock into correspondingly shaped grooves on the abutting side surfaces of the other of the trapezoidal-shaped members.

BRIEF DESCRIPTION OF THE DRAWINGS

FIG. 1 is a sectional view of three wall elements, each with mounted tongue and groove profiled members according to the invention, which are disposed adjacent one another prior to interconnecting to form a body.

FIGS. 2a–2c are cross-sectional views through profiled members showing alternate embodiments of tongue and groove arrangements according to the invention.

FIG. 3a is a cross-sectional view of three wall elements showing a detachable further embodiment of the invention with the wall elements in both their connected and pre-connection states.

FIG. 3b is a cross-sectional view, similar to FIG. 3a, but showing a further nondetachable or locking embodiment of the invention.

FIG. 5 is a transverse cross-sectional view of a tongue and groove arrangement according to the invention with the parts connected.

FIG. 6 is a transverse cross-sectional view of the tongue and groove arrangement of FIG. 5 with the parts separated.

FIG. 7 is a longitudinal cross-sectional view of the tongue and groove arrangement of FIG. 5 with the parts separated.

FIG. 8 is a transverse cross-sectional view, of a modification of the tongue and groove arrangement of FIG. 5.

FIG. 9 is a perspective view, greatly enlarged, of a further modification of the tongue and groove arrangement of FIG. 5 with the parts separated.

DETAILED DESCRIPTION OF THE PREFERRED EMBODIMENTS

Figure 4:
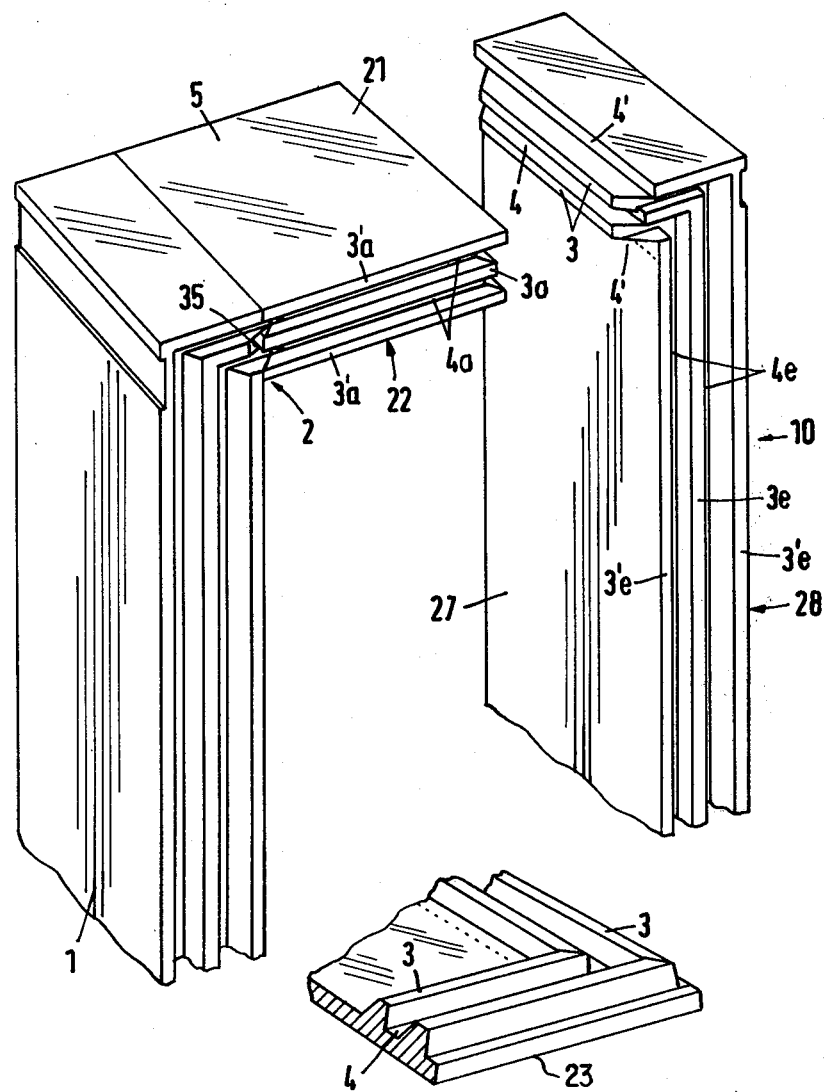
FIG. 4 is an isometric representation of four wall elements with tongues and grooves according to the invention.

Turning now to FIG. 1 there is shown a body which is to be formed of three wall elements 1, 5 and 10 with the wall element 1 having a profiled member 2 mounted on its inner connecting surface along one edge of same. In the illustrated embodiment the profile of the profiled member 2 has two tongues 3, each with a trapezoidal transverse cross-section, and a groove 4, also with a trapezoidal transverse cross-section, between the tongues 3. The cross-section of tongues 3 and groove 4 is, as shown, preferably of the same shape and size. The base portion of profiled member 2 protruding beyond the base of groove 4 is so deeply inset into the surface of the wall element 1 that the thickness of the base and the groove base are flush with the inner surface of the wall element 1.

The second wall element 5, which is thicker than wall element 1, can be secured at its frontal face or edge surface to profiled 2 member and thus to wall element 1. For this purpose, wall element 5 has a profiled member 6 on one frontal or narrow edge surface with the profiled member 6 being composed of band material, as opposed to the full profiled member 2. The profiled member 6 of band material is inserted into the frontal face of wall element 5 so as to to be completely flush with same. For this purpose a recess having a shape complementary to that of member 6 was previously milled in the frontal face of wall element 5. The profiled member 6 has two trapezoidal grooves 4a corresponding in shape and size to the tongues 3 of profiled member 2. Additionally, the adjacent sides or flanks of the grooves 4a of profiled member 6 form a tongue 3a between them which fits into groove 4 of profiled member 2.

Formed in at least one (and preferably in both as shown) flank or side surface 7 of each tongue 3 (and consequently of the groove 4) of profiled member 2 is a longitudinal recess 8 with a cross-section in the form of a segment of a circle. These longitudinal recesses 8 engage correspondingly shaped and positioned projections 9 on the flanks or side surfaces 7a of the grooves 4a and tongues 3a of profiled member 6 on assembly to connect the elements 1 and 5 together. In the same manner the third wall element 10 is connected to the opposing frontal face of wall element 5 by means of a further pair of profiled members 2 and 6 with mating tongues and grooves. The force necessary for the locking connection and the holding force depend on the size and type of recesses 8 and projections 9 and on the material of profiles 2 and 6. Sufficient elasticity is produced by profiled members formed of a suitable plastic (e.g. polyethylene, polyamides, polypropylene, polyvinychloride, polycarbonates).

In addition to the locking hold of the profiled members 2 and 6 to one another, a clamping band, belt or cable 11, which preferably is made of steel, can surround the body and abut the outer surfaces of the wall elements at the level of wall element 5 to press the wall elements 1 and 10 against the wall element 5. As shown, preferably the band 11 is inset in outer grooves formed from U-shaped profiled strips 12 inset in the outer surfaces of the wall elements. These profile strips 12 can be closed to the outside by covering strips 13.

Instead of connecting a solid profiled member 2 with a profiled member 6 of band material as shown in FIG. 1, it is also possible, as shown in FIGS. 2a and 2b for both of the profiled members being attached to one another to both be of the solid type, e.g. members 2 and 6a of FIG. 2a, or for both of the profiled members to be of the type formed from band material, e.g. profiled members 2a and 6 of FIG. 2b. Moreover, the profiled members 2a and 6 of FIG. 2b are preferably shaped so that when they are assembled or engaged as shown in FIG. 2c, longitudinal cavities 14 are formed between the base of each groove 4 or 4a and the crown or top of the associated tongue 3a or 3 respectively. Each of these cavities 14 is provided with an elastic band or cord 15, preferably of plastic, of a size such it will be compressed between the base of the groove and the crown of the tongue. The bands or cords 15 are formed of an elastic material whose elasticity is considerably greater than that of the profiled members 2a and 6 (e.g. rubber, foam rubber, asbestos cord).

As shown in FIGS. 3a and 3b the tongues and grooves need not have a trapezoidal cross-section as in FIGS. 1, and 2a–2c but rather according to the invention may have any shape wherein the flanks or side surfaces of the tongues, and consequently also of the grooves, are inclined with respect to the base of the respective profiled members and converge, i.e., get closer together, with increasing distance from the base of the profiled member. For example, in the embodiments shown in FIGS. 3a and 3b the respective grooves 4b and 4c and the respective tongues 3b and 3c have approximately semi-circular cross-sections. Moreover, the associated tongues and grooves are dimensioned such that a cavity 14a is formed between the profiled members 2b and 6b of FIG. 3a and between the profiled members 2c and 6c of FIG. 3b. This cavity 14a extends over the largest portion of the profile widths so that the associated profiled members 2b and 6b and the members 2c and 6c only abut one another at their outer flanks. Note that to form this cavity 14a in these embodiments, the groove formed by the facing flanks of the adjacent tongues, e.g. the groove 4d formed by the tongues 3b of FIG. 3a, and its associated tongue, for example the tongue 3d formed by the flanks of the adjacent grooves 4b of FIG. 3a, do not have the same shape as the remaining tongues and grooves nor do they have shapes which are complementary to each other. This cavity 14a permits restricted movement of the wall elements relative to one another. In order to avoid this relative movement after the elements have been assembled in their desired position, and to seal the cavity 14a, an elastic band 15 having a circular cross-section in the unstressed state is placed in the groove 4d so that it can be compressed and spread out by the pointed tongue 3d. Alternatively, the cavity 14a can be filled with a hardenable and/or permanently elastic plastic mass or foam. Such a plastic material can be introduced into the cavity 14a via the channel or base 16 formed in one of the wall elements. For example the hardenable elastic plastic mass may be, e.g., a polyvinlychloride-foam, whereas the permanently elastic plastic mass may be, e.g., polyurethane-foam).

Since the profiled members 2b and 6b of FIG. 3a and the members 2c and 6c of FIG. 3b only abut one another at their outer flanks, associated projections and recesses are provided only in these outer areas. In the embodiment shown in FIG. 3a the recesses 8 and projections 9 have a cross-section in the form of a segment of a circle as in the previous figures. However, in the embodiment of FIG. 3b, the profiled members 2c and 6c are provided with projections 17 and recesses 18 which are saw tooth-shaped, with the steeper flank of the saw tooth therein facing the base of the respective tongue or groove. Such a saw tooth-shaped structure permits a connection which is not detachable in the direction opposite to that of assembly when sufficiently firm or hard material is used for the profiled members without destroying the tooth-shaped projection 17 or recess 18. However, the profiled members 2c and 6c can be detached again by shifting them axially relative to one another in the longitudinal direction. Whereas profiled members 2 and 6 of FIG. 1 are secured to the wall elements 1, 5 and 10 by a suitable adhesive or by screws, the profiled members 2b and 2c, shown in FIGS. 3a and 3b, and if desired the members 6b and 6c, are fastened to the wall elements, in addition to or alternatively, by means of a further tongue and groove arrangement including groove 19 and tongue 20.

If sealing of the tongue and groove connection is unnecessary as, for example, in furniture making, it is also possible to attach only short profiled strips to the side elements, which need also only extend to the height and depth of a side element, and nevertheless have a high degree of form stability.

It is also possible to mount corresponding shaped parts (groove-tongue-angle) with a tongue exchange according to FIG. 4 in all corner areas. The tongue exchange is explained in further detail below in conjunction with FIG. 4. A more detailed description of this basic arrangement is found in applicant's copending U.S. application Ser. No. 956,428, filed Oct. 31, 1978, now U.S. Pat. No. 4,270,324, issued June 2, 1981.

Of the three wall elements 1, 5 and 10 shown in FIG. 4, wall element 5 has two surfaces 21 and 22. Two trapizoidal grooves 4a run along the edge or narrow surface so as to define the trapizoidal tongue 3 there between. Two half tongues 3'a, i.e., tongues which have only about half the thickness of the tongues 3a and have only one oblique flank, provide the outer flanks for the grooves 4a and provide the outer edges of the side surfaces 21 or 22. Grooves 4a and tongues 3a, as well as the half tongues 3'a also extend along the other narrow edges of the flat wall element 5 which border on this corner area in the same construction and arrangement. It is noted that although not specifically shown in this figure, the tongues and grooves are provided with engaging projections and recesses as in FIG. 1.

The wall element 10 also has two side surfaces 27 and 28. Two tongues 3, between which a groove 4 extends, are disposed on side surface 27 along one longitudinal edge of wall element 10. Half grooves 4' are disposed towards the outside of the two tongues 3. These half grooves 4' each have about half the cross-section of groove 4 and are aligned in arrangement and dimensions to the half tongues 3'a. In this arrangement the lower groove 4' is in fact, only composed of a free space. The narrow upper surface portion of wall element 10 forms a continuation of side surfaces 21 of the wall element 5 after the wall elements 5 and 10 have been assembled.

Flat wall element 10 has two grooves 4e on its narrow front edge defining a tongue 3e which extends there between. A half tongue 3'e in each case forms the edge of the side surfaces 27 and 28.

In the corner area the left-hand half tongue 3'e of element 10 passes or merges into the lower half groove 4' which, in practice, is present only in theory, whereas the tongue 3e is cut off obliquely at the end of its upper, approximately horizontal part and passes, at approximately a right angle, into the base of groove 4. The same applies with regard to the passing of the backs or crowns of tongues 3 into the bases of grooves 4e. These oblique transition positions where the groove(s) and tongues on the surface 27 pass into tongues and grooves respectively on the edge surfaces of of element 10 all extend at an angle of 45° with respect to the base of the respective groove 4 or the crown of the respective tongue 3.

The base of the upper half groove 4' likewise passes or merges at a right angle into the back or crown of the right hand half tongue 3'e.

Tongues 3 and 3a and grooves 4 and 4a are aligned respectively to one another in their dimensions in such a way that a cross-section portion 35 remains free in each case between the back or crown of a tongue 3 or 3a and the base of a groove 4 or 4a respectively so that a band seal (not shown here) can be inserted into the cross-section portion 35.

All the grooves and half grooves, tongues and half tongues each have an approximately trapezoidal cross-section and are dimensioned such that a force pressing wall elements 5 and 10 against one another in the connecting direction is substantially only transferred via the flanks of the associated grooves and tongues. Only an insubstantial part of this force serves to press together the seals which are each inserted in the cross-section portion 35. Wall elements 1, 5 and 10 stand on a base 23 which has two tongues 3 and a groove 4 therebetween which extend all around at the edges on its upper side, and which engage in the continuous tongues and grooves extending along the edge surfaces of the elements, e.g. the grooves 4e and the tongue 3e.

According to another embodiment of the invention, two-part connecting elements can be provided as shown in FIGS. 5 to 9. These connecting elements are constructed according to the tongue and groove principle and have a receiving portion 29 with a troughlike indentation or groove which is trapezoidal in both its longitudinal and transverse cross-sections with the inner walls or flanks converging or coming closer to one another with increasing distance from the surface, i.e. towards the inside. An insert part or tongue 30 is self-centeringly inserted into this receiving portion 29 with the shape of this insert part or tongue 30 corresponding to the shape of the trapezoidal indentation or groove in the receiving portion 29 and completely filling this groove. Semicircular or if desired toroidal elevations or projections 31 are moulded longitudinally onto the longitudinal sides or flanks of the insert or tongue part 30. These elevations or projections 31 lock into longitudinal recesses 32 formed in the flanks of the groove in the receiving portion 29. The receiving portion 29 and the insert part or tongue 30 are each secured in or on a frame and a covering surface or ledge respectively by their base surfaces so that these parts can be releasably secured to one another to form a body. In the embodiment shown in FIG. 9, the partly cylindrical elevations or projections 31a are arranged transverse to the direction of connection on the inner walls or flanks of the groove in the receiving portion 29 and the corresponding recesses 32a are arranged in the side walls or flanks of the tongue 30.

If desired, as shown in FIG. 8, a longitudinal slit 33 can be formed in the crown of the tongue 30 between the projections 31 and at right angles to the base of the tongue. Such a slit 33 increases the spring effect of the projections or side surfaces (flanks) of the tongue.

By means of the construction shown in the above Figures, tongue and groove profiled members and further frames can be connected to already existing window casements without any special skills in the craft.

It is to be understood that the above description of the present invention is susceptible to various modifications, changes and adaptations, and the same are intended to be comprehended within the meaning and range of equivalents of the appended claims.

What is claimed is:

1. In a body formed of at least first and second connected individual elements which are connected together at abutting respective connecting surfaces by means of tongue and groove connections with one of said elements having at least one tongue on its said connecting surface and the other of said elements having at least one groove on its said connecting surface for receiving said at least one tongue, each said tongue having flanks which are inclined with respect to the base of the tongue and converge with increasing distance from said base, and each said groove having a shape such that the flanks of the groove will abut the adjacent flanks of the associated tongue; the improvement wherein for each associated said tongue and said groove, at least one flank of one of said associated tongue and groove is provided with a projection and the associated said flank of the other of said associated tongue and groove is provided with a recess which engages said projection when said tongue is inserted into the associated said groove; and wherein said projection and the associated said recess have shapes such that said projection is releasably engaged in said recess by a snapping action.

2. A body as defined in claim 1, wherein one of said connecting surfaces has at least a pair of adjacent said tongues defining a groove therebetween; wherein the other said connecting surface has at least a pair of adjacent said grooves with the adjacent flanks of said grooves simultaneously defining the flanks of a tongue; and wherein said pair of tongues are associated with said pair of grooves, and said groove defined by the adjacent said pair of tongues is associated with said tongue defined by said flanks of said adjacent said pair of grooves.

3. A body as defined in claim 1, wherein said projection and said recess correspond to one another in shape.

4. A body as defined in claim 1, wherein each pair of abutting flanks of an associated said tongue and groove has a projection which is engaged in a recess.

5. A body as defined in claim 1, wherein said projections and said recesses extend over the entire length of said tongues and said grooves.

6. A body as defined in claim 1, wherein said projections and said recesses have a cross section in the form of a segment of a circle.

7. A body as defined in claim 1 or 6, wherein the shapes of said tongue and its associated said groove and such that at least one cavity is formed between the base of said groove and the crown of said tongue; and means are provided for filling at least a portion of said cavity.

8. A body as defined in claim 7, wherein said means comprises a hardened mass which substantially fills said cavity.

9. A body as defined in claim 7, wherein said means comprises an elastic mass which substantially fills said cavity.

10. A body as defined in claim 7, wherein said means comprises at least one elastic band.

11. A body as defined in claim 10, wherein one said elastic band is positioned in the base of each said groove with said band abutting said crown of the associated said tongue.

12. A body as defined in claim 1, wherein each said groove and tongue is formed by the profile of a member which is attached to the associated one of said first and second elements at its respective said connecting surface.

13. A body as defined in claim 12, wherein each said profile member is secured to its respective one of said elements by a groove and tongue connection.

14. A body as defined in claim 12, wherein at least one of said profiled members is composed of an elastic material.

15. A body as defined in claim 1, wherein: said first and second elements are substantially flat and are arranged to form a corner; one of said first and second elements has a plurality of adjacent said tongue and grooves which extend along the edge surfaces of same; and the other of said elements has a plurality of said tongues and grooves which mate with the said tongues and grooves of said one of said first and second elements, and which extend along one side surface of said other of said first and second elements and then along at least one of the edge surfaces transverse to said side surface, said tongues on said side surface merging into the grooves of said transverse edge surface and said grooves on said side surface merging into the tongues on said transverse edge surface.

16. A body as defined in claim 15, wherein the transition portions from said tongues to said grooves extend at an angle of 45° with respect to the crown of the tongues and the base of the grooves.

17. A body as defined in claim 1 further comprising a clamping band which surrounds and abuts the outer surface of said body for holding said elements together.

18. A body as defined in claim 17, wherein said grooves and their associated said tongues are dimensioned such that the force exerted by said clamping band is substantially transferred between said flanks of said grooves and tongues.

19. A body as defined in claim 1, wherein said groove is troughlike and is trapezoidal in cross-section; said tongue has a cross-section which matingly engages in said groove; said projection and said recess extend along the respective flanks of said groove and said tongue in the longitudinal direction of their trapezoidal profiles; and each pair of the abutting longitudinal flanks of said tongue and said groove is provided with an engaging said projection and recess.

20. A body as defined in claim 19, wherein said projection and said recess each have the transverse cross-sectional shape of a portion of a circle.

21. A body as defined in claim 19, wherein said projections are disposed on said flanks of said troughlike groove and said recesses are formed in said flanks of said tongue.

22. A body as defined in claim 19, wherein both the transverse and longitudinal cross section of said tongue and of said groove are trapezoidal.

23. A body as defined in claim 2 wherein each pair of abutting flanks of an associated said tongue and groove has a projection which is engaged in a recess.

* * * * *